United States Patent
Quail

(10) Patent No.: US 9,728,105 B2
(45) Date of Patent: Aug. 8, 2017

(54) VASCULAR NECK RESTRAINT TRAINING DEVICE

(71) Applicant: Jeffrey James Quail, Winnipeg (CA)

(72) Inventor: Jeffrey James Quail, Winnipeg (CA)

( * ) Notice: Subject to any disclaimer, the term of this patent is extended or adjusted under 35 U.S.C. 154(b) by 211 days.

(21) Appl. No.: 14/624,160

(22) Filed: Feb. 17, 2015

(65) Prior Publication Data
US 2015/0235570 A1 Aug. 20, 2015

Related U.S. Application Data

(60) Provisional application No. 61/940,429, filed on Feb. 16, 2014.

(51) Int. Cl.
*G09B 23/28* (2006.01)
*G09B 19/00* (2006.01)

(52) U.S. Cl.
CPC .......... *G09B 23/28* (2013.01); *G09B 19/003* (2013.01)

(58) Field of Classification Search
CPC .... G09B 23/28; G09B 19/003; A63B 69/345; A63B 2244/108; A63B 224/102; A63B 224/104; A63B 2244/106
See application file for complete search history.

(56) References Cited

U.S. PATENT DOCUMENTS

2010/0211096 A1* 8/2010 McEwen ............ A61B 17/1355 606/203
2014/0277101 A1* 9/2014 Smith ................ A61B 17/1325 606/202

OTHER PUBLICATIONS

Anatomy of Cervical Region (Neck).*
Takuya Matsuyama, Kazuhiro Yoshikawa, Yudai Yamazaki, Mitsuhiro Shikida Miyoko Matsushima, and Tsutomu Kawabe, "Integration of Catheter flow Sensor onto Tracheal Intubation Tube System", Janurary 20, 2013, IEEE, 1-4.*

* cited by examiner

*Primary Examiner* — Sam Yao
*Assistant Examiner* — Lily M Del Valle
(74) *Attorney, Agent, or Firm* — Ryan W. Dupius; Kyle R. Satterthwaite; Ade+Company Inc.

(57) ABSTRACT

A vascular neck restraint training device is used for raining a first person to execute a vascular neck restraint on a second person. The training device includes a supporting structure, such as a collar for being supported about the neck of the second person, upon which a tracheal pressure sensor, and two arterial pressure sensors are supported for alignment with the trachea and the carotid arteries of the second person respectively. The sensors detect if an applied pressure during a vascular neck restrain exceeds a prescribed pressure threshold for that sensor and provides corresponding indication to the first person applying the pressure. The training device indicates if too much pressure is applied to the trachea corresponding to a respiratory neck restraint, and if sufficient pressure is applied to each of the carotid arteries for executing a successful vascular neck restraint.

16 Claims, 3 Drawing Sheets

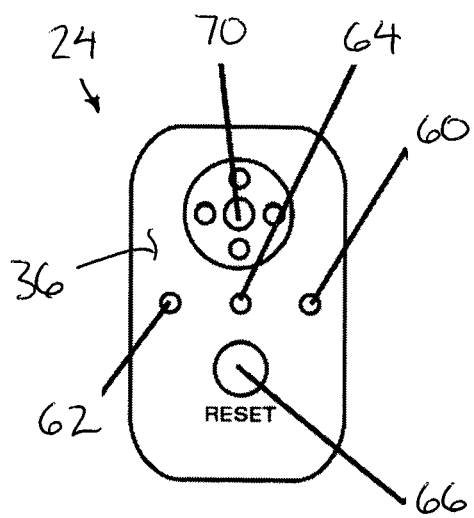
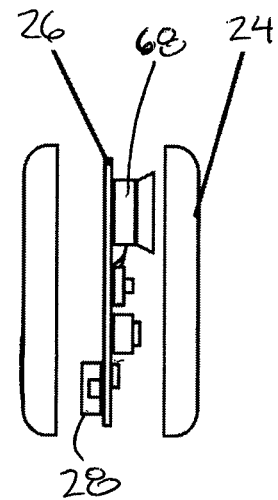
FIG. 4  FIG. 5
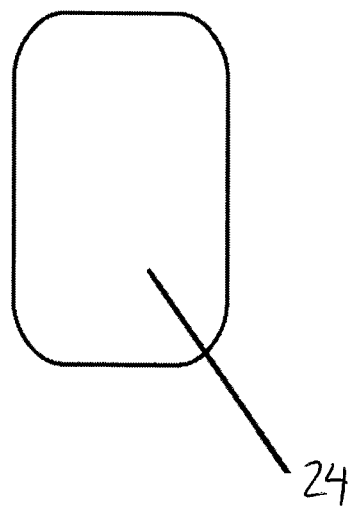
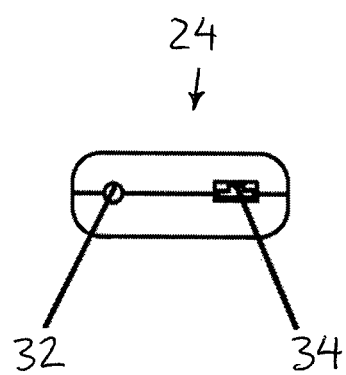
FIG. 6  FIG. 7

VASCULAR NECK RESTRAINT TRAINING DEVICE

This application claims the benefit under 35 U.S.C. 119(e) of U.S. provisional application Ser. No. 61/940,429, filed Feb. 16, 2014.

FIELD OF THE INVENTION

The present invention relates to a vascular neck restraint training device and a method of use thereof to provide user feedback when applying a vascular neck restraint, and more particularly the present invention relates to a training device comprising a supporting structure for supporting pressure sensors on a neck of a person to which a vascular neck restraint is to be applied to indicate if sufficient pressure is applied to the vascular region and/or to indicate if too much pressure is applied to the tracheal region of the person.

BACKGROUND

A vascular neck restraint describes a technique used by police to control a resistant subject by applying pressure to the carotid arteries located on both sides of the neck. The arms are used to squeeze the sides of the neck in an effort to occlude the carotid arteries which leads to transient cerebral ischemia. When properly applied, it can render an individual unconscious in as little as 5 to 10 seconds. This makes it an extremely effective physical control method for law enforcement to use on highly combative individuals. Unfortunately, if the technique is applied incorrectly it can lead to death or severe injury. The margin of error in application is extremely narrow. If the pressure is inadvertently applied to the trachea, larynx and/or hyoid bone, serious injury can result. When pressure is applied to these high risk areas, the neck restraint is referred to as a "respiratory neck restraint" and is considered by the police and courts to be a deadly force application. Numerous deaths have occurred when law enforcement officers have improperly applied a vascular neck restraint during a real world encounter.

SUMMARY OF THE INVENTION

According to one aspect of the invention there is provided a training device for providing user feedback during a vascular neck restraint, the device comprising:

at least one sensor adapted to detect an applied pressure which exceeds a prescribed pressure threshold;

a supporting structure adapted to support said at least one sensor on a neck of a person in alignment with one of carotid arteries and a trachea of the person; and an indicator operatively connected to said at least one sensor so as to provide an indication responsive to a detection by said at least one sensor of an applied pressure which exceeds the prescribed pressure threshold.

According to a second aspect of the present invention there is provided a method training a first person to execute a vascular neck restraint on a second person, the method comprising:

providing a training device comprising at least one sensor adapted to detect an applied pressure which exceeds a prescribed pressure threshold and an indicator operatively connected to said at least one sensor so as to provide an indication responsive to a detection by said at least one sensor of an applied pressure which exceeds the prescribed pressure threshold; and positioning said at least one sensor on a neck of the second person in alignment with one of carotid arteries and a trachea of the person such that the indicator is enabled to provide the indication by the application of a pressure by the first person to said one of carotid arteries and a trachea of the person that exceeds the prescribed pressure threshold.

Preferably at least one sensor is supported in alignment with one of the carotid arteries of the person and one sensor is supported in alignment with the trachea of the person, in which the sensors can be repositioned relative to one another on a common supporting structure such that the sensors may be properly aligned with the carotid arteries and the trachea respectively of different users.

The vascular neck restraint training device described herein assists in teaching police officers and martial artists how to safely apply a vascular neck restraint. The device provides feedback on both properly applied and improperly applied neck restraint techniques. The device can be used in all levels of physical skills training, from static to stimulus—response to fully dynamic scenarios. It also provides protection from injury to the individual wearing the device.

Preferably the sensors include an arterial sensor supported on the supporting structure so as to be adapted for alignment with each one of the carotid arteries of the person and a tracheal sensor supported on the supporting structure so as to be adapted for alignment with the trachea of the person.

In some instance, the indicator may include an audible alarm, a visual alarm, a sensory indication such as a vibration, or any combination thereof. Preferably the indicator comprises a plurality of independent indicator elements, each indicator element being response to a respective one of the sensors.

The indicator elements may each include a latching element operable to maintain the indicator in an active indicating state subsequent to detection by the respective sensor of an applied pressure which exceeds the prescribed pressure threshold until the indicator is manually reset.

Preferably the supporting structure comprises a collar adapted to be secured about the neck of the person and which is adjustable in circumferential size.

Each sensor may be supported on the collar so as to be adjustable in circumferential position relative to the collar.

Preferably an upper edge of the collar is shaped to define a pair of lobes at circumferentially spaced apart positions so as to be adapted for alignment with respective ones of the carotid arteries of the person when a recess between the pair of lobes is aligned with a chin of the person. In this instance, the pair of arterial sensors are preferably supported on the collar in alignment with the pair of lobes respectively so as to be adapted for alignment with both carotid arteries of the person respectively and the tracheal sensor is supported on the collar in alignment with the recess between the pair of lobes so as to be adapted for alignment with the trachea of the person.

The collar may include a flexible fabric layer supporting the sensors thereon and a stiffener layer which is more rigid than the flexible fabric layer spanning at least a portion of an inner side of the flexible fabric layer so as to be arranged to be positioned between the sensors and the neck of the person.

The supporting structure may also comprise a resilient layer arranged to be positioned between the sensors and the neck of the person.

This device will assist officers in learning how to properly apply the vascular neck restraint during training, increasing the odds of successfully applying the technique in the field without injuring the subject.

According to the illustrated embodiment, the training device designed to fit around the neck to provide feedback and protection when training how to properly, safely and effectively apply a vascular neck restraint. The device is manufactured in fabric with either a padded or semi rigid interior to provide strength and resistance when pressure is applied to the neck. Three separate force sensors are embedded in the device and are positioned over the following landmarks on the neck:

i) The right common carotid artery. The force sensor traces the right common carotid artery in the area of the neck covered by the device. The sensors are designed to match the surface area of the carotid artery in the compressed position. The amount of pressure required to trigger an event is the average pressure needed to compress the common carotid artery.

ii) The left common carotid artery. The force sensor traces the left common carotid artery in the area of the neck covered by the device. The sensors are designed to match the surface area of the carotid artery in the compressed position. The amount of pressure required to trigger an event is the average pressure needed to compress the common carotid artery.

iii) The upper respiratory tract. The force sensor traces the upper respiratory tract in the area of the neck covered by the device. The sensors are designed to match the surface area of the upper respiratory tract. The amount of pressure required to trigger an event is substantially lower than the force needed to occlude the trachea.

The force sensors are wired to an electronic controller/display at the rear of the device that will provide feedback when pressure is applied to any of the sensors.

According to the illustrated embodiment, when a neck restraint is applied to an individual who is wearing the device, the display at the rear of the device will illuminate two green lights when both carotid artery sensors have reached the required force to trigger an event. The lights will remain illuminated until the device is reset. The device will also illuminate a red light and trigger an audio warning when the sensors tracing the upper respiratory tract reach the required force to trigger an event. The alarm and light will not shut off until the device is reset.

This allows trainers to have an empirical means of testing if their students are properly applying the desired vascular neck restraint and identifying when they are inadvertently applying pressure to the windpipe. At the same time, it offers physical protection from the compression of the neck, along with an audio warning if the force is being applied to the windpipe.

This system will allow instructors to have an empirical means of measuring the force exerted by the student and ensure the pressure is applied to the proper location on the neck.

One embodiment of the invention will now be described in conjunction with the accompanying drawings in which:

BRIEF DESCRIPTION OF THE DRAWINGS

FIG. 4 is an elevational view of an outer side of the controller housing of the training device;

FIG. 5 is an exploded side view of the controller housing of the training device;

FIG. 6 is an elevational view of an inner side of the controller housing;

FIG. 7 is a bottom view of the controller housing of the training device;

In the drawings like characters of reference indicate corresponding parts in the different figures.

DETAILED DESCRIPTION

Figure 1:
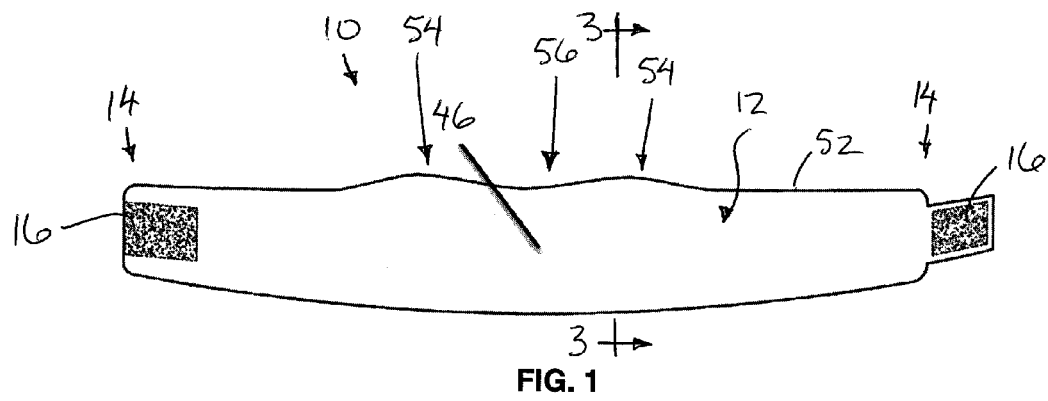
FIG. 1 is a front elevational view of the assembled supporting structure of the training device.

Referring to the accompanying figures, there is illustrated a vascular neck restraint training device generally indicated by reference numeral 10. The device 10 is useful for providing feedback to a first person training to properly apply a vascular neck restraint to a second person.

The device 10 generally includes a supporting structure 12 in the form of an elongate strip spanning in a longitudinal direction between two opposed ends 14. Fasteners 16 are provided at the opposed ends 14, for example in the form of co-operating hook and loop fasteners, for coupling the two ends together in an annular loop about the neck of the second person in a manner which permits the overall circumference of the assembled collar to be adjustable.

The device 10 further includes a set of sensors supported on the supporting structure 12 for sensing pressure applied by the first person about the neck of the second person at prescribed locations on the supporting structure. The sensors include a right side carotid arterial sensor, a left side carotid arterial sensor 20 and a tracheal sensor 22 supported therebetween. The sensors are intended to be supported on the supporting structure for alignment with the trachea and the carotid arteries of the second person respectively when in use.

A controller housing 24 is further provided which includes an electronic controller 26 supported therein in the form of a printed circuit board with a battery 28 connected thereto to supply electrical power to the controller. The controller housing 24 is supported externally on the supporting structure 12 and is connected to each of the sensors by suitable electrical leads 30.

A first external port 32 is provided at a bottom end of the housing 24 in connection with the electronic controller 26 internal within the housing to which the leads 30 of the sensors can be connected while permitting ready separation therefrom when repositioning the various components relative to one another for example.

The housing 24 also includes a second port 34 in the form of a mini USB port 34, also externally located at the bottom side of the housing, and also in connection with the electronic controller 26 within the housing. The second port 34 provides for charging of the battery 28 or for communicating data recorded on the controller from the controller to an external device through a USB connection for example.

The controller housing 24 is typically supported at the rear of the assembled collar of the supporting structure 12 so as to be diametrically opposed from the sensors at the front side. An outer front face 36 of the controller is positioned to be outwardly visible and locates various indicators thereon as described in further detail below.

The supporting structure 12 generally includes a base layer 40 in the form of a fabric lining which spans the full length of the supporting structure in the longitudinal direction between the two opposed ends 14. A supporting layer 42 also formed of fabric similarly spans between the two ends 14 of the supporting structure at a location which is forward or outward in relation to the base layer. The supporting layer 42 and the base layer 40 are spaced apart to define a pocket therebetween for receiving an intermediate layer 44 therein. The outer or front side of the supporting layer 42 comprises a plurality of loops formed thereon for cooperation with corresponding hook type fasteners on the sensors to adjustably support the sensors on the front or outer side of the supporting layer as described in further detail below.

The intermediate layer 44 comprises a plastic or foam layer received within the pocket between the base layer 40 and the supporting layer 42. The intermediate layer provides some resiliency or cushioning while being stiffer or more rigid than the fabric layers to provide some structural support to the fabric layers while also providing some protection from injury to the second person.

The supporting structure further includes a cover 46 in the form of a sleeve structure formed of a front panel 48 and a back panel 50 joined together at longitudinally extending opposed top and bottom edges. The cover is suitably sized and shaped to fully span and enclose the above noted layers, which are received within the sleeve structure of the cover in an assembled configuration. The cover 46 serves to protect and enclose the sensors supported on the supporting layer 42 therein while providing support for the housing 24 of the controller externally thereon. For ease of attachment and removal from the other layers, the cover may have a longitudinally extending seam along the bottom edge which can be closed by Velcro® for example. Alternatively, the ends of the sleeve structure forming the cover 46 may be open to permit the remaining layers to be longitudinally slidable into and out of the cover structure.

The assembled supporting structure includes a continuous and generally straight bottom edge between the two opposed ends 14. The top edge 52 of the assembled structure however has a contoured shape include two upwardly protruding lobes 54 and a central recess 56 between the lobes. More particularly, the central recess 56 is generally centered between the two ends 14 so as to be suitable for alignment with the chin of the person wearing the structure when the two opposed ends 14 are fastened together with the suitable fasteners 16 at the diametrically opposing rear of the neck of the user. The two lobes 54 are provided adjacent to and on opposing sides of the central recess 56 so as to be suitably arranged for alignment with the carotid arteries of the user wearing the device, when the recess 56 is aligned with the chin of the person.

Each of the sensors comprises an electronic pressure sensor arranged to emit a continuous pressure signal indicative of the amount of pressure applied at the sensor location. Each sensor is arranged to be generally elongate between opposing top and bottom ends. Hook attachments are provided at the rear side for cooperation with the loops formed on the front outer side of the supporting layer 42 so as to permit the sensors to be securely located on the front side of the supporting layer at any one of numerous positions thereon. The cooperating hook and loop fasteners permit repositioning of the sensors relative to the supporting structure and relative to one another for optimally aligning the sensors with the respective ones of the carotid arteries and the trachea of the person.

The electronic controller 26 cooperates with the sensors and associates a prescribed pressure threshold with each sensor. The controller is configured to receive the continuous pressure signal from each sensor and determine if the pressure signal exceeds the prescribed pressure threshold at any given time. If at any time, the applied pressure exceeds the prescribed pressure threshold for that sensor, the controller determines an activation condition for that particular sensor only. If multiple sensors have applied pressures which exceed the respective pressure thresholds thereof, than multiple activation conditions are determined.

The indicator on the outer visible face 36 of the controller housing takes the form of a separate indicator element associated with each sensor. Each indicator element is a respective light emitting diode which is external visible on the outer face of the housing. More particularly, the indicator includes a right indicator element 60 which is associated with a right carotid arterial sensor 18 and is arranged to be illuminated responsive to the controller determining an activation condition of that sensor. Similarly, the indicator elements include a left indicator element 62 associated with the left carotid arterial sensor 20 to be illuminated when that sensor is determined by the controller to have an activation condition. Finally, a central indicator element 64 is provided which is in association with the tracheal sensor 22 to be illuminated only when an activation condition is determined by the controller in relation to the tracheal sensor. The three indicator elements are located in a row with their relative position corresponding to the positions of the respective sensors at the front side of the supporting structure.

The electronic controller 26 includes a latching element associated with each of the above noted indicator elements which is operational to latch the indicator element and maintain the corresponding LED in an illuminated state. Once activated, even if the applied pressure no longer exceeds the pressure threshold, the latching element maintains the corresponding indicator element illuminated until the controller is reset by the user depressing a reset button 66. The reset button 66 is externally located on the outer face of the controller housing.

The controller 26 further includes an auxiliary indicator 68 in the form of a speaker which broadcasts an audio indication responsive to determination of an activation condition in relation to the tracheal sensor 22 only. No latching element is associated with the auxiliary indicator 68 such that the audio indication ceases automatically upon pressure applied to the tracheal sensor either falling below the threshold or being removed entirely. The speaker is supported on the printed circuit board and communicates externally through the outer face of the housing 24 by a suitable speaker opening 70 in the outer face of the housing.

As noted above, FIG. 1 shows a front view of the neck restraint training device completely covered by the outer fabric cover. A Velcro® assembly exists at both ends of the cover so it can be fixed in place around the wearer's neck.

Figure 2:
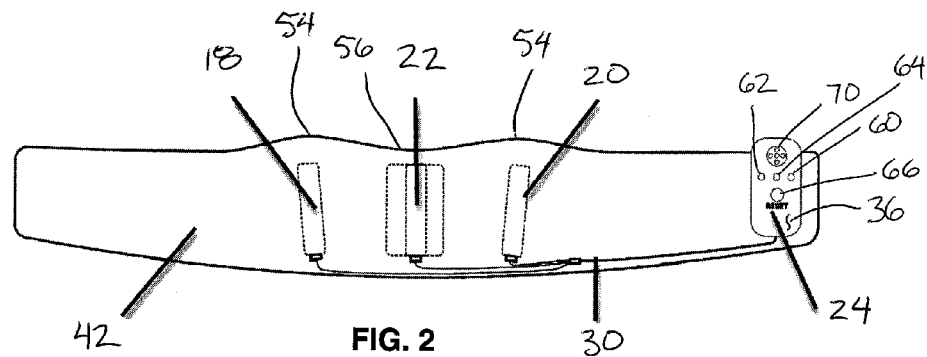
FIG. 2 is a front elevational view of the supporting structure of the training device with the outer cover removed.

FIG. 2 shows a front view of the device with the outer fabric cover removed. The right carotid artery sensor is shown as an example of how it may be placed in position on top of with Velcro®. The left carotid artery sensor is shown as an example of how it may be placed in position on top of with Velcro®. The upper respiratory tract sensor is shown how it is affixed in position to align with the chin cutaway of the neck collar assembly. The wires from all the sensors lead to the controller/display which is mounted in the desired position on top of by Velcro®.

Figure 3:
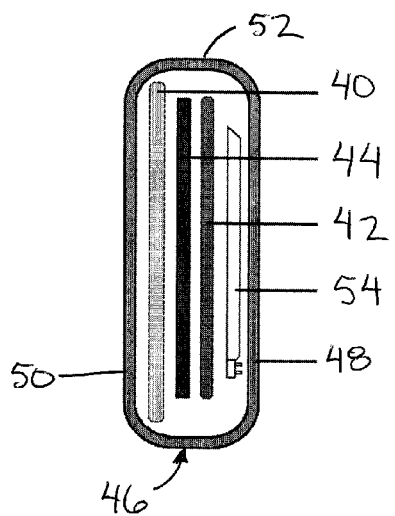
FIG. 3 is a sectional view along the line 3-3 of FIG. 1.

FIG. 3 shows a cut away view of the neck collar assembly. The device consists of many layers. Moving away from the neck when the device is being worn, the backing fabric is designed to allow the plastic/foam insert. The plastic/foam insert gives protection and rigidity. Then another layer of fabric with Velcro® is placed over the plastic/foam insert that allows the electric sensors to be held into position. Finally, the fabric cover covers the entire collar assembly to protect the electronic sensors.

FIGS. 4, 5, 6 and 7 show a front view, an exploded side view, a rear view, and a bottom view of the controller/display unit respectively. The circuit board is mounted between the rear case and the front case of the controller/display unit. The speaker, the two green LED lights, the red LED light, the reset button are all exposed and displayed on the front/outer side of the controller/display unit. The mini USB port is located at the bottom of the controller/display unit and allows the unit to recharge its rechargeable battery. The wire port allows the sensors to be plugged into the circuit board.

Figure 8:
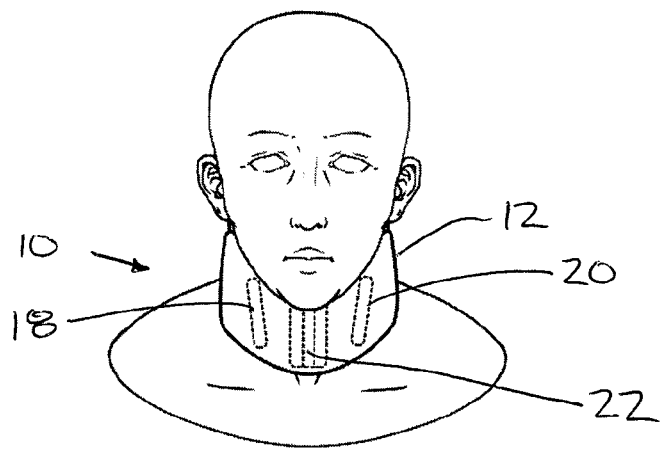
FIG. 8 is a front view of the training device supported about the neck of a person.
Figure 9:
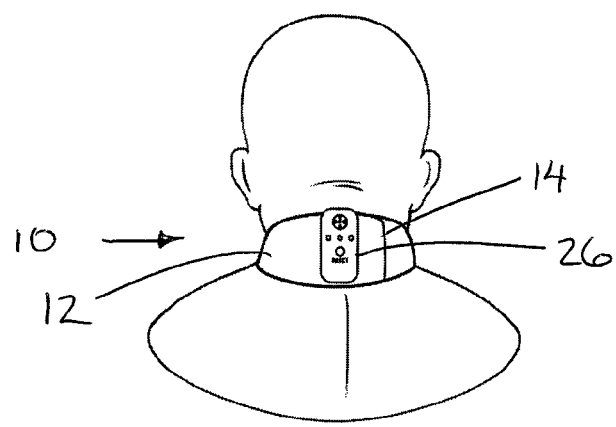
FIG. 9 is a rear view of the training device supported about the neck of the person.
Figure 10:
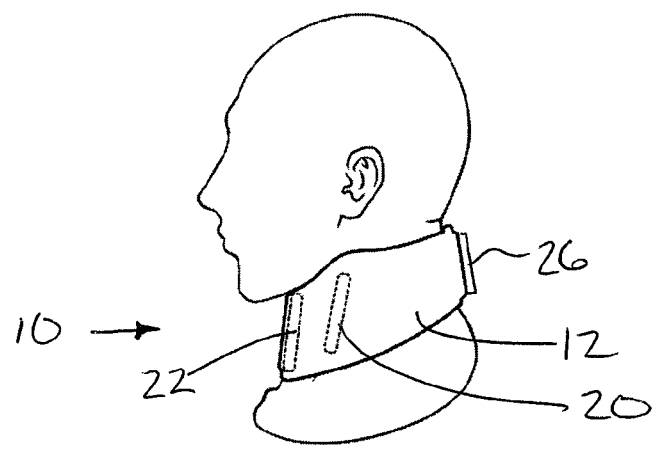
FIG. 10 is a side view of the training device supported about the neck of the person.

FIGS. 8, 9 and 10 show front, side and rear views of the training device being worn around in the desired configuration around an individual's neck.

For operation of the training device, the outer fabric cover is first removed from the neck collar assembly. The neck collar assembly is then placed in the proper position on the neck of the subject wearing the device. The proper position is achieved when the upper respiratory tract sensor directly covers the upper respiratory tract of the individual wearing the device. Once this is achieved, the neck collar assembly is secured in position by affixing the Velcro® component at the rear of the neck. Then, the right carotid artery sensor is moved to be perfectly aligned with the right carotid artery of the wearer. The left carotid artery sensor is then moved to become completely aligned with the left carotid artery of the wearer. The controller/display unit is then affixed by Velcro® to the rear of the neck of the wearer, directly in the center. Finally, the outer fabric cover is replaced overtop of the electronics.

Once the unit has been properly configured for the individual who is wearing it, the device is ready for use during training. To utilize the unit, it must be turned on by pressing and holding the reset button on the controller/display unit. The short audio tone will sound from the speaker and all three led lights will illuminate briefly to confirm the unit is functioning. Once the tone has stopped and the led lights have cycled, the unit is in ready mode.

Once in ready mode, the training can begin. The student will apply the vascular neck restraint to the wearer of the device. When the arm applies pressure to the right carotid artery sensor, and the defined force threshold is reached on the sensor, then the right carotid artery LED green light indicator will illuminate and stay on even until the device is reset. When the arm applies pressure to the left carotid artery sensor, and the defined force threshold is reached in the sensor, then the left carotid artery LED green light indicator will illuminate and stay on until the device is reset. When the arm applies pressure to the upper respiratory tract sensor, and the defined force threshold is reached in the sensor, then the upper respiratory tract LED red light indicator will illuminate and the audio warning tone will sound. The audio tone will stop sounding when the pressure is released below the defined threshold, but the LED red light indicator will remain illuminated until the device is reset.

The following events may occur during training:

i) Only the right carotid artery LED green light indicator is illuminated. This provides feedback to the student that proper placement and adequate force was applied to the right carotid artery only and that inadequate force was applied to the left carotid artery. It also indicates that excessive force was not applied to the upper respiratory tract.

ii) Only the left carotid artery LED green light indicator is illuminated. This provides feedback to the student that proper placement and adequate force was applied to the left carotid artery only and that inadequate force was applied to the right carotid artery. It also indicates that excessive force was not applied to the upper respiratory tract.

iii) Only the right and left carotid artery LED green light indicators and are illuminated. This provides feedback to the student that proper placement and adequate force was applied to both the left and right carotid artery. It also indicates that excessive force was not applied to the upper respiratory tract. This event represents the desired training application.

iv) Only the upper respiratory tract LED red light indicator illuminates and the audio warning tone sounds. This provides feedback to the student that excessive force was applied to the upper respiratory tract. It also indicates that inadequate force was applied to both the right and left carotid artery.

v) Only the upper respiratory tract LED red light indicator illuminates, with audio warning, along with the right carotid artery LED green light indicator. This provides feedback to the student that adequate force was applied to the right carotid artery, inadequate force was applied to the left carotid artery and that excessive force was applied to the upper respiratory tract.

vi) Only the upper respiratory tract LED red light indicator illuminates, with audio warning, along with the left carotid artery LED green light indicator. This provides feedback to the student that adequate force was applied to the left carotid artery, inadequate force was applied to the right carotid artery and that excessive force was applied to the upper respiratory tract.

After each training event, the reset button is pressed to reset the device to the ready state. If the device is not used within a specified period of time it will shut off. It can be placed into ready state after being shut off by pressing the reset button.

In alternatively embodiments of the invention, different materials, sizes and textures can be used for all components. Furthermore, the device can be integrated into full body protection suits. In other instances, in lieu of electronic force sensors, hydraulic tubing with force sensor or air lines with force sensors could be used or any combination. Also, the collar could be made completely out of injection foam with sensors embedded. Other modes of communicating events could be used such as vibration, recorded audio or other stimulus. Feedback could be transmitted wirelessly to a remote display that may be stand alone, a computer, tablet, smart phone, etc. In yet further embodiments, precise details of force applications can be recorded and displayed.

Since various modifications can be made in my invention as herein above described, it is intended that all matter contained in the accompanying specification shall be interpreted as illustrative only and not in a limiting sense.

The invention claimed is:

1. A training device for providing user feedback during a vascular neck restraint applied to a person, the device comprising: one or two arterial sensors adapted to detect an externally applied pressure which exceeds a prescribed pressure threshold corresponding to an average pressure needed to compress a common carotid artery of the person in the application of the vascular neck restraint; a tracheal sensor adapted to detect an externally applied pressure which exceeds a prescribed pressure threshold corresponding to a pressure which is less than pressure required to occlude a trachea of the person; a supporting structure adapted to support said one or two arterial sensors externally on a neck of the person in alignment with one or two of the carotid arteries and the tracheal sensor externally on the neck of the person in alignment with the trachea of the person; and an indicator operatively connected to said one or two arterial sensors and the tracheal sensor so as to provide (i) a first indication responsive to a detection by said one or two arterial sensors of an externally applied pressure which exceeds the prescribed pressure threshold of the arterial sensors and (ii) a second indication different than the first indication responsive to a detection by the tracheal sensor of an externally applied pressure which exceeds the prescribed pressure threshold of the tracheal sensor.

2. The device according to claim 1 wherein said one or two arterial sensors comprises a pair of arterial sensors supported on the supporting structure so as to be adapted for alignment with both carotid arteries of the person respectively.

3. The device according to claim 1 wherein the indicator includes an audible alarm responsive to the detection by the tracheal sensor of the externally applied pressure which exceeds the prescribed pressure threshold of the tracheal sensor.

4. The device according to claim 1 wherein the indicator comprises a plurality of indicator elements, each indicator element being responsive to a respective one of the plurality of sensors detecting the respective externally applied pressures which exceed the respective prescribed pressure thresholds.

5. The device according to claim 1 wherein the indicator includes a latching element operable to maintain the indicator in an active indicating state subsequent to detection by one of the sensors of an applied pressure which exceeds the prescribed pressure threshold of that sensor until the indicator is manually reset.

6. The device according to claim 1 wherein the supporting structure comprises a collar adapted to be secured about the neck of the person.

7. The device according to claim 6 wherein the collar is adjustable in circumferential size.

8. The device according to claim 6 wherein the sensors are supported on the collar so as to be adjustable in circumferential position relative to one another on the collar.

9. The device according to claim 6 wherein an edge of the collar is shaped to define a pair of lobes at circumferentially spaced apart positions so as to be adapted for alignment with respective ones of the carotid arteries of the person when a recess between the pair of lobes is aligned with a chin of the person.

10. The device according to claim 9 wherein said one or two arterial sensors comprises a pair of arterial sensors supported on the collar in alignment with the pair of lobes respectively so as to be adapted for alignment with both carotid arteries of the person respectively.

11. The device according to claim 9 wherein the tracheal sensor is supported on the collar in alignment with the recess between the pair of lobes so as to be adapted for alignment with the trachea of the person.

12. The device according to claim 6 wherein the collar comprises a flexible fabric layer supporting the sensors thereon and a stiffener layer which is more rigid than the flexible fabric layer spanning at least a portion of an inner side of the flexible fabric layer so as to be arranged to be positioned between the sensors and the neck of the person.

13. The device according to claim 1 wherein the supporting structure comprises a resilient layer arranged to be positioned between the sensors and the neck of the person.

14. A method of training a first person to execute a vascular neck restraint on a second person, the method comprising: providing a training device comprising one or two carotid artery sensors adapted to detect an externally applied pressure which exceeds a prescribed pressure threshold corresponding to an average pressure needed to compress a common carotid artery of the second person in the application of a vascular neck restraint and an indicator operatively connected to said one or two carotid artery sensors so as to provide an indication responsive to a detection by the sensor of an externally applied pressure which exceeds the prescribed pressure threshold; a tracheal sensor adapted to detect an externally applied pressure which exceeds a pressure threshold corresponding to a pressure which is less than a pressure required to occlude a trachea of the person; positioning said one or two carotid artery sensors externally on a neck of the second person such that said one or two carotid artery sensors are in alignment with the carotid arteries of the second person; and using the indicator to indicate when the external application of a pressure by the first person to said one or two of carotid arteries of the second person exceeds the prescribed pressure threshold of the carotid artery sensors supported on that carotid artery.

15. The method according to claim 14 wherein said one or two carotid artery sensors comprises a pair of carotid artery sensors and wherein the method includes repositioning the sensors relative to one another circumferentially about the neck of the second person along a common supporting structure.

16. A method of training a first person to execute a vascular neck restraint on a second person, the method comprising: providing a training device comprising a tracheal sensor adapted to detect an externally applied pressure which exceeds a prescribed pressure threshold corresponding to a pressure which is less than a pressure required to occlude a trachea of the second person and an indicator operatively connected to the tracheal sensor so as to provide an indication responsive to a detection by the sensor of an externally applied pressure which exceeds the prescribed pressure threshold of that sensor; one or two arterial sensors adapted to detect an externally applied pressure which exceeds a prescribed pressure threshold corresponding to an average pressure needed to compress a common carotid artery of the person in the application of the vascular neck restraint; positioning the tracheal sensor externally on a neck of the second person such that the tracheal sensor is in alignment with the trachea of the second person; and using the indicator to indicate when the external application of a pressure by the first person to the trachea of the second person exceeds the prescribed pressure threshold of the tracheal sensor.

* * * * *